Nov. 2, 1954     J. M. WILLIAMSON     2,693,337
VALVE FOR CORROSIVE FLUIDS
Filed April 11, 1949
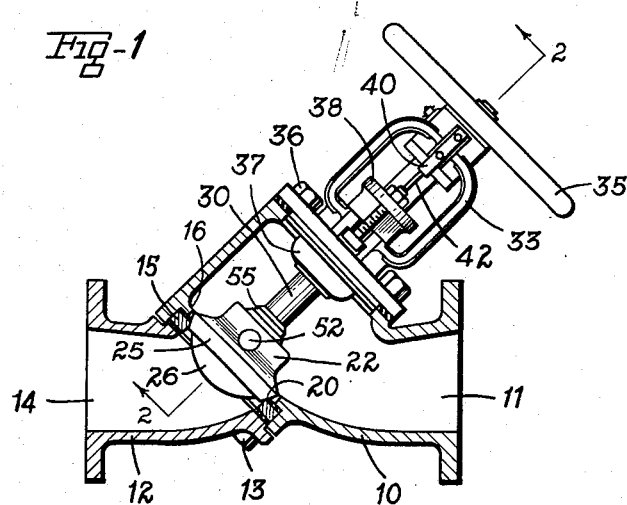
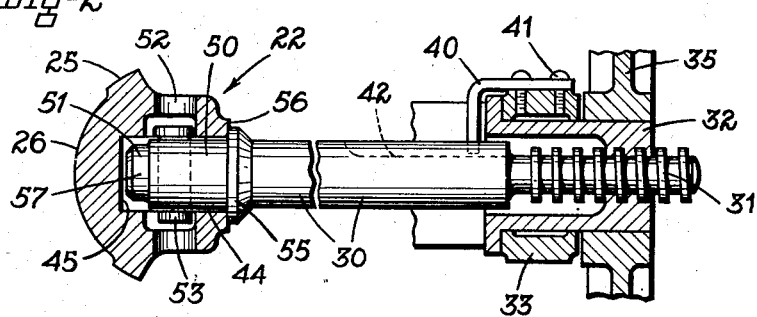
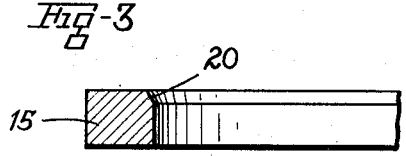
INVENTOR.
BY James M. Williamson
Marechal & Biebel
ATTORNEYS United States Patent Office 2,693,337
Patented Nov. 2, 1954

2,693,337

VALVE FOR CORROSIVE FLUIDS

James M. Williamson, Dayton, Ohio, assignor to The Duriron Company, Inc., Dayton, Ohio, a corporation of New York Application April 11, 1949, Serial No. 86,797

2 Claims. (Cl. 251—87)

This invention relates to valves, and more especially to valves having particular utility for controlling corrosive liquids and other fluids requiring handling equipment constructed of special alloys to minimize corrosion or erosion thereof by the fluids in contact therewith.

Satisfactory results have been obtained in the past in handling many fluids of this nature by means of valves constructed of stainless steel, which has high tensile strength and high resistance to many acids and other corrosive fluids. For example, one form of valve found satisfactory for such uses includes a tapered valve seat and a complementary valve member having a spherically curved convex portion arranged to fit the tapered valve seat, and in valves of this type wherein the valve seat and valve member are formed of stainless steel, highly satisfactory results have been obtained with the operating stem for the valve member so arranged and connected thereto that the thrust urging the valve member into valve-closing relation with the valve seat is applied inwardly of the valve member at the center of its forward portion to place the valve member in tension when in closed position.

It has been found, however, that when this form of stainless steel valve is used for some fluids, corrosion or "wire drawing" of the mating surfaces of the valve seat and valve member may occur, which results in preventing the desired tight seal and permits leakage even when the valve member is pressed firmly into contact with the valve seat. This undesirable result can be avoided by forming the valve seat and valve member of an iron alloy having high resistance to fluids which attack stainless steel, such for example as iron alloys containing a high percentage of silicon. However, although such high silicon iron alloys are exceedingly hard and highly resistant to fluids capable of corroding stainless steel, they possess little tensile strength as compared with stainless steel and tend to crack if subjected to tension.

It is accordingly the principal object of the present invention to provide a valve for handling corrosive fluids wherein the valve member is so designed for cooperating action with the valve seat that it may be placed under compression and not in tension when in valve-closing position, and thus to provide for manufacture of these parts from high silicon iron alloys having high resistance to corrosion and wire drawing while minimizing the development of undesirable tensile stresses in these parts in use.

Another object is to provide such a valve wherein the valve member includes a ball portion at its forward end for valve-closing contact with the valve seat and wherein the operating stem for the valve member is so connected therewith that the valve member is urged to valve-closing position by thrust applied to the rearward portion thereof in such manner as to place the valve member under compression and thus to minimize the development of tensile stresses therein.

It is also an object of the invention to provide such a valve wherein the valve member is hollow and includes a forward portion formed for valve-closing contact with the valve seat, and wherein one end of the operating stem is received within the valve member but is maintained in spaced relation with the inner surface of the forward end thereof by a shoulder on the stem which engages the rearward portion of the valve member to compress the entire valve member against the valve seat when in closed position and thus to prevent the development of such tensile stresses therein as might cause fracture of the valve member.

Other objects and advantages of the invention will be apparent from the following description, the accompanying drawing and the appended claims.

In the drawing—

Fig. 1 is a sectional view showing a ball valve embodying a valve member constructed of a high silicon iron alloy in accordance with the invention;

Fig. 2 is an enlarged sectional view showing the valve member of Fig. 1, the view taken approximately on the line 2—2 of Fig. 1; and Fig. 3 is a fragmentary sectional view showing a replaceable valve seat for the valve of Fig. 1.

Referring to the drawing, which illustrates a preferred embodiment of the invention, Fig. 1 shows a Y valve wherein the valve body comprises a two-piece casing, the casing member 10 having an outlet passage 11 and the casing member 12 being bolted to member 10 at 13 and having an inlet passage 14, satisfactory results having been obtained with both of these casing members formed of a highly corrosion-resistant and high strength alloy such as stainless steel. An annular replaceable valve seat member 15 is mounted to enclose the valve passage connecting the outlet and inlet passages 11 and 14, member 15 being clamped between the inner end of the casing part 12 and a shoulder 16 integrally formed with casing part 10, gaskets being provided on either side of member 15 as shown. The member 15 is approximately rectangular in cross section, as shown in Fig. 3, and it has a frusto-conical champfered portion 20 along the inner periphery thereof facing outlet passage 11, which forms the tapered surface on which the valve member 22 seats to close the valve.

The valve member 22 is shown as of ball configuration and has a spherically curved annular surface 25 adjacent its front end which is of the proper radius to seat on the tapered surface 20 of valve seat 15. The front end portion 26 of member 22 is also spherically curved but on a smaller radius than the portion 25. Valve member 22 is carried by a stem 30 having a threaded outer end portion 31 received within a tapped bushing 32 journaled in the upper end of a yoke 33 and secured to an operating handwheel 35, as by being force fitted therein. The lower end of yoke 33 is bolted to the casing part 10 at 36 and includes a portion 37 forming a stuffing box for the stem and provided with a suitable gland 38. A key member 40 is screwed to yoke 33 at 41 and engages within a groove 42 in stem 30 to prevent the stem from rotating in the yoke, and it will thus be seen that rotation of bushing 32 and handwheel 35 will cause axial travel of stem 30 and resulting movement of the valve ball 22 into and out of valve-closing relation with the tapered surface 20 of valve seat 15.

Fig. 2 shows in enlarged detail the construction of the valve member 22 and stem 30. The valve ball 22 is largely hollow, having a central bore 44 at the inner end which terminates in an end surface 45. The stem 30 has a cylindrical portion 50 which is received within the bore 44 with substantial radial clearance, for example a clearance of the order of 0.027 to 0.038 inch, and the stem 30 also has an end portion 51 of reduced diameter within the valve ball. The valve ball 22 also has a transverse bore 52 to receive a lock pin 53 set in stem portion 50, the bore 52 being of sufficiently greater diameter than pin 53 to provide clearance permitting limited movement of the valve member on the stem to wipe a clean seat as the valve member moves into closed position during use of the valve.

The stem 30 is formed with a circumferential shoulder or collar 55 which is adapted to engage the rearward end surface 56 of valve member 22. This shoulder is located at such distance from the inner end of the stem that when it is thus in engagement with the valve member, the inner end 57 of the stem will be maintained in spaced relation with the end surface 45 of bore 44. Accordingly, when the hand wheel is operated to close the valve, the shoulder 55 will transfer the thrust from stem 30 directly to the rearward end of the valve ball 22, and thus when the latter is tightened into closed position, it will be under compression between shoulder 55 and the valve seat member 15 to avoid tension thereof.

This construction and mode of operation have been found well suited for use with the valve member formed of a hard corrosion-resisting alloy, since they employ to advantage the rigidity and corrosion-resistance of such alloys without developing tensile stresses in the parts capable of causing damage thereto. For example, highly satisfactory results have been obtained in handling corrosive fluids with a valve constructed as shown in Fig. 1 and having the valve ball 22, and also the valve seat member 15, formed of a brittle iron alloy containing a high percentage of silicon, such for example as an alloy of one of the following formulas:

|  | A | B |
|---|---|---|
| Silicon | 14.50 | 14.50 |
| Carbon | 0.85 | 0.85 |
| Manganese | 0.50 | 0.50 |
| Sulphur | 0.08 | 0.08 |
| Phosphorus | 0.20 | 0.20 |
| Molybdenum |  | 3.00 |
| Iron | 83.87 | 80.87 |

In the use of this valve, the valve member is under compression when closed against the valve seat, with the only transfer of thrust from the stem taking place at the rearward end of the valve member, and the development of tensile stresses is thus avoided so that the low tensile strength of such alloys is not a disadvantage. Valves of this construction wherein the valve member is formed of one of the above alloys have accordingly been found highly efficient for use even with corrosive fluids capable of attacking stainless steel, and such valves give satisfactory results over a long effective life in installations where a stainless steel valve member would be rendered useless by corrosion.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A valve adapted for controlling corrosive fluids comprising a valve body formed of corrosion-resistant relatively high strength alloy and having a flow passage therethrough, an annular valve seat surrounding said flow passage and formed of highly corrosion-resistant relatively low tensile strength alloy, a largely hollow valve member of highly corrosion-resistant low tensile strength alloy movable within said flow passage with respect to said valve seat and having a spherical surface at the forward end thereof adapted to engage said valve seat for closing said flow passage, said valve member having a transverse through bore and an axial bore extending through the rearward end thereof to a position forward of said transverse bore, a valve stem extending into said valve member through said axial bore, a pin longer than the diameter of said axial bore and of lesser diameter than said transverse bore received in said stem through said transverse bore to secure said valve member to said stem, a shoulder on said stem for engaging the rearward end of said valve member to urge said valve member into seating engagement with said seat, said shoulder being spaced from the forward end of said stem by a distance less than the length of said axial bore to effect said seating engagement of said valve member by development of compression therewithin while maintaining the forward end of said stem out of contact with said valve member to prevent the development of tensile stresses therein, and said valve stem being of lesser diameter than said axial bore to provide sufficient radial clearance for said stem in said valve member for limited movement of said valve member on said stem to wipe a clean seat as said valve member moves into closed position with respect to said seat.

2. In a valve for controlling corrosive fluids and including a valve body formed of corrosion-resistant relatively high strength alloy having a flow passage therethrough and an annular valve seat surrounding said flow passage and formed of highly corrosion-resistant relatively low tensile strength alloy, a valve member and valve stem unit movable in said flow passage with respect to said valve seat and consisting of a largely hollow valve member of highly corrosion-resistant low tensile strength alloy having a spherical surface at the forward end thereof adapted to engage said valve seat for closing said flow passage, said valve member having a transverse through bore and an axial bore extending through the rearward end thereof to a position forward of said transverse bore, a valve stem extending into said valve member through said axial bore, a pin longer than the diameter of said axial bore and of lesser diameter than said transverse bore received in said stem through said transverse bore to secure said valve member to said stem, a shoulder on said stem for engaging the rearward end of said valve member to urge said valve member into seating engagement with said seat, said shoulder being spaced from the forward end of said stem by a distance less than the length of said axial bore to effect said seating engagement of said valve member by development of compression therewithin while maintaining the forward end of said stem out of contact with said valve member to prevent the development of tensile stresses therein, and said valve stem being of lesser diameter than said axial bore to provide sufficient radial clearance for said stem in said valve member for limited movement of said valve member on said stem to wipe a clean seat as said valve member moves in closed position with respect to said seat.

References Cited in the file of this patent

UNITED STATES PATENTS

| Number | Name | Date |
|---|---|---|
| 941,934 | Marsh | Nov. 30, 1909 |
| 1,019,278 | Restucci | Mar. 5, 1912 |
| 1,150,779 | Lord | Aug. 17, 1915 |
| 1,664,270 | Shelvin | Mar. 27, 1928 |
| 1,763,486 | Strong | June 10, 1930 |
| 1,850,953 | Armstrong | Mar. 27, 1932 |
| 1,915,064 | Malcom | June 20, 1933 |
| 1,951,037 | Paterson | Mar. 13, 1934 |
| 2,470,700 | Henry | May 17, 1949 |

FOREIGN PATENTS

| Number | Country | Date |
|---|---|---|
| 14,415 | Great Britain | Mar. 27, 1932 |

OTHER REFERENCES

Weldman & Dornblatt "Engineering Alloys," American Soc. Metals, 1936 (Duriron p. 110, S. N. 412, Durichlor p. 260, S. N. 4,434).

Perry (Ed.) Chem. Eng. Handbook, McGraw-Hill, 1941 (Table 3, p. 2,114, Durichlor-Duriron).